United States Patent [19]

Andersson

[11] 3,943,716

[45] Mar. 16, 1976

[54] CONTROL ARRANGEMENT, PREFERABLY FOR REMOTE CONTROLLED, HYDROSTATICALLY OPERATED HOIST MACHINERIES

[75] Inventor: Rune Andersson, Vasteras, Sweden

[73] Assignee: Linden Alimak AB, Vasteras, Sweden

[22] Filed: Nov. 21, 1974

[21] Appl. No.: 525,808

[30] Foreign Application Priority Data

Dec. 7, 1973 Sweden .............................. 7316573

[52] U.S. Cl. ........................ 60/444; 60/446; 60/905; 92/131

[51] Int. Cl.[2] ........................................... F16H 39/46

[58] Field of Search ........ 92/131; 60/391, 444, 446, 60/905

[56] References Cited

UNITED STATES PATENTS

| | | | |
|---|---|---|---|
| 2,092,580 | 9/1937 | Kelly | 92/131 |
| 2,516,662 | 7/1950 | Vickers et al. | 60/444 |
| 2,864,239 | 12/1958 | Taylor | 60/391 |
| 3,713,291 | 1/1973 | Kubik | 60/446 |
| 3,748,857 | 7/1973 | Heiser | 60/446 |

FOREIGN PATENTS OR APPLICATIONS

| | | | |
|---|---|---|---|
| 644,649 | 4/1937 | Germany | 92/131 |

*Primary Examiner*—Paul E. Maslousky
*Attorney, Agent, or Firm*—Elliott I. Pollock

[57] ABSTRACT

The cable drum for the hoist cable of a hoisting device is driven by a hydraulic motor with a constant displacement that in its turn obtains drive fluid from a pump with a variable displacement. The displacement of the pump, and with that the speed and rotational direction of the cable drum, is operated by means of the rod of a piston in a double acting hydraulic cylinder, the piston being displaceable in the cylinder by means of pressure fluid, which pressure and direction of flow is adjustable by means of valves, which in their turn are operated electrically from a control lever. Movement of the piston rod is permanently counteracted by a friction means, such that the piston by the control lever can be brought to stop in steplessly optional positions, and thereby the cable drum can be brought to rotate with steplessly optional speeds, notwithstanding the pressure of the fluid acting on the piston is only adjustable to three different pressure levels (atmospheric pressure, lower over pressure and higher over pressure).

5 Claims, 13 Drawing Figures

CONTROL ARRANGEMENT, PREFERABLY FOR REMOTE CONTROLLED, HYDROSTATICALLY OPERATED HOIST MACHINERIES

This invention relates to a control arrangement with a control means actuated by a fluid preferably for control of the displacement of a hydraulic pump with variable displacement, which is a drive source of a hydraulic motor, which in its turn drives a cable drum of a hoist cable in a lifting arrangement, which control means is operable by the force of a fluid pressure against the action of spring means from a O-position to a first position, which can coincide with the O-position and from there to an end position.

It is known to provide hoist machineries with hydrostatical transmission systems arranged between a drive source for a pump and a hydraulic motor for the hoist machinery. Such systems offer several advantages, e.g. the possibility of adjusting the speed and the possibility of controlling acceleration and retardation.

Another essential advantage is that the drive source can consist of a simple short-circuit A.C. motor with direct start.

In order to achieve speed control in conventional electrical drive systems it is necessary that the drive source be a slip ring A.C. motor or D.C. motor with collector and brushes. For such drive systems the necessary associated electrical equipment in the form of contactors and other electrical components is very comprehensive. Especially in such equipments located outdoors, errors of electrical type are however the most common reasons for interruption of work.

For hydrostatic transmission systems the number of electrical apparatuses is considerably limited, the causes of operating troubles being substantially reduced.

Also the property of hydrostatic transmissions to make possible a control of acceleration and retardation processes within wide limits is an essential advantage, which is realized, if it is considered that according to Swedish standards for hoisting gears dynamic forces arising at starting and braking of a hoisting or hauling motion should be calculated to amounts often exceeding 80% of the dead weight of the load to be moved.

In spite of the obvious advantages of hydrostatic transmissions such have so far only been used with isolated special hoisting equipments and in fields, where a limited domestic and foreign competition exists. The reasons for this are the higher establishment charges, which have so far been combined with the hydrostatic components.

For example in the crane building industry, where there is strong competition, no manufacturer has so far found it possible, for said reasons, to turn to hydrostatic transmission for the hoisting motion.

Usually a building crane is operated electrically from a portable control means. Therefore the crane operator can place himself so that he will always keep a strict watch over the working field of the crane. Hitherto a lower speed, which is suitable at e.g. careful adjustment of different building elements, has occured at such portable operating means in addition to normal hoisting speed. Mainly for economical reasons, but also to a certain extent due to increased weight of the control means to be carried by the crane operator it has up to now not been possible to realize systems permitting setting of arbitrary intermediate positions of hoisting and hauling speeds respectively. However, for a long time there has been a well-known need of being able to coordinate two crane motions relative to each other from a portable control means, e.g. hoisting motion and swinging motion. Thus, in such a way the necessary swinging motion and the necessary hoisting motion can be started and finished simultaneously for a certain work.

Said disadvantages are eliminated by the arrangement according to the present invention.

The arrangement of the invention is built according to a simplified principle for hydrostatic transmission especially suitable to satisfy the demands at hoisting machineries of building cranes and which by its simple construction can be manufactured at costs competitive with so far existing, electrical, direct drives. By means of the invention all the advantages resulting from the hydrostatic transmission principle are obtained. Operation is carried out from an easily portable control box. In addition to one fixed high and one fixed low hauling and hoisting speed also arbitrary speeds can be set between these positions.

Illustrative examples of the invention and its use are given below in connection with the enclosed drawing, in which

Figure 9:
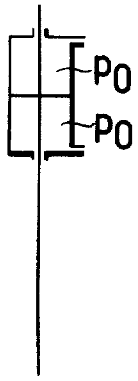
Figure 10:
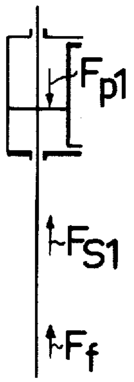
Figure 11:
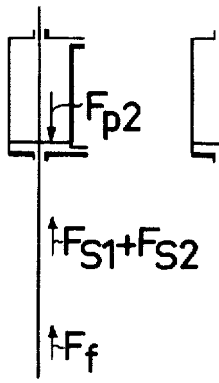
Figure 12:
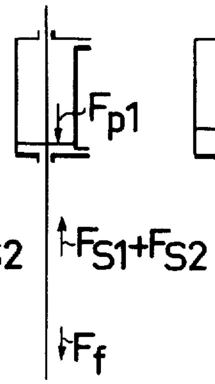
Figure 13:
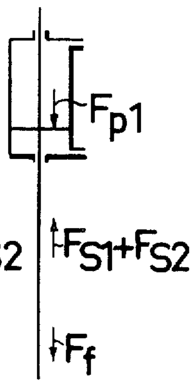

FIGS. 9 –0 13 show the forces acting on the primary shaft the control means at the lever positions shown in FIGS. 3 – 7.

Figure 1:
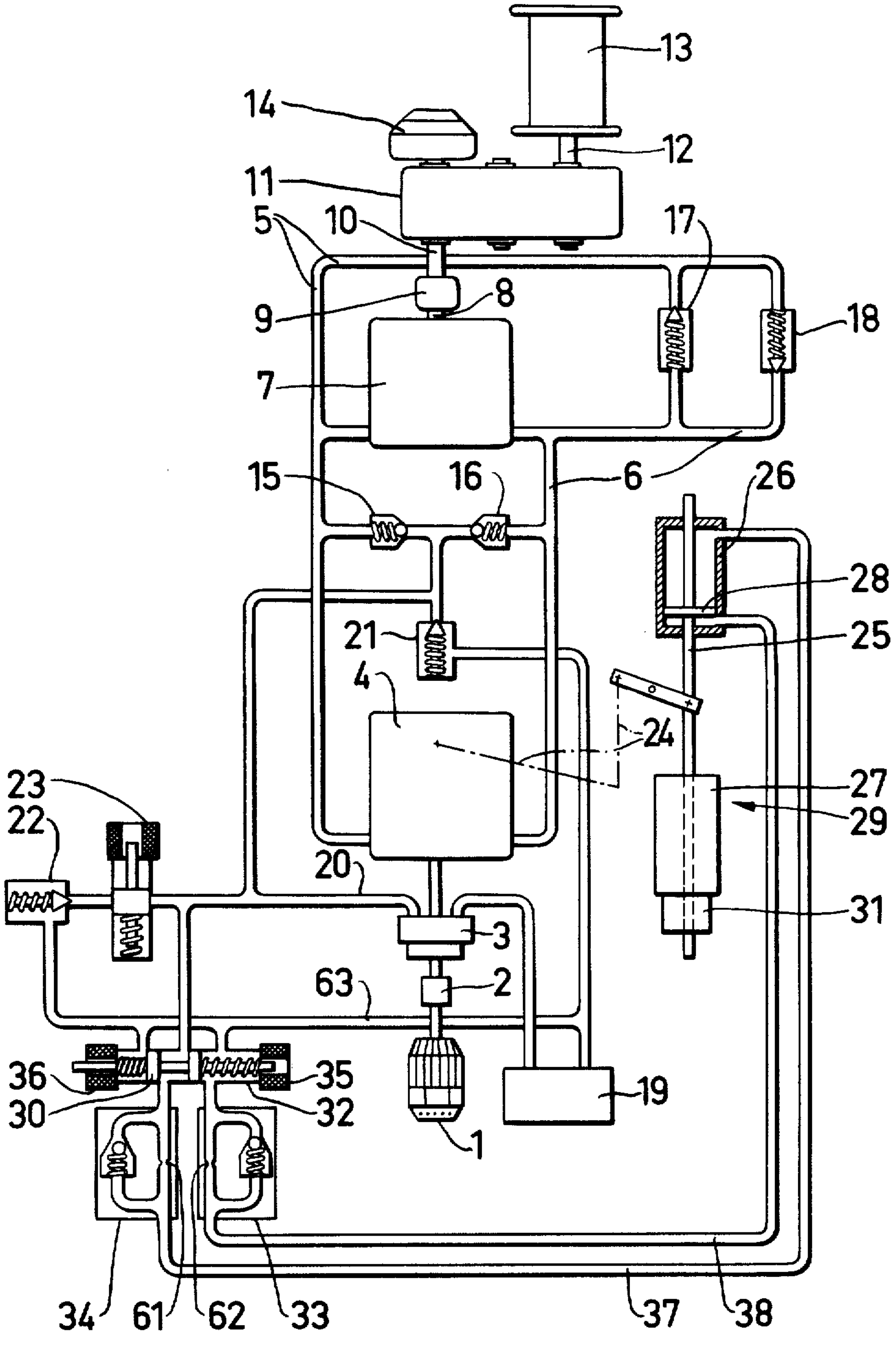
FIG. 1 shows schematically a cable drum driven hydrostatically by a pump, whose displacement is controllable by means of a control means according to the invention.

With reference to FIG. 1 an electric motor 1 drives a first pump 3 and a second pump 4 via a coupling 2. The displacement of the pump 4 is steplessly variable. The pump 4 drives via conduits 5 and 6 a hydraulic motor 7 with a constant displacement. The motor 7 is connected to the primary shaft 10 of a gear reduction set 11 via a coupling 9 and a cable drum 13 is arranged on the output shaft of said gear reduction set 11. Moreover an electrically influenceable brake 14 is operative to act on the shaft 10. Between the conduits 5 and 6 non-return valves 15 and 16 and pressure relief valves 17 and 18 are arranged.

The pump 3 serves to deliver pressure medium to a control means 29 for controlling the displacement of the pump 4. The pump 3 delivers pressure medium to a conduit 20 at super atmospheric pressure, which pressure can have two different values, i.e. a predetermined higher overpressure $p_2$ the magnitude of which is determined by means of a first pressure relief valve 21, and a predetermined lower overpressure $p_1$ the magnitude of which after opening of an electrically operable valve 23 is determined by means of a second pressure relief valve 22.

The control means 29 serving to adjust the pump 4 includes a linearly movable control shaft 25, which is operable by means of a piston 28 in a cylinder 26. The control shaft 25 is connected to the pump 4 via an articulated means 24 to adjust the displacement of said pump 4. The piston 28 cooperates with a spring means 2 and a friction means 31 acting on the control shaft 25 at the adjustment of said control shaft. The piston 28 is operable by means of pressure medium from the conduit 20 via two conduits 37 and 38. The direction of motion of the control piston 28 can be shifted by means of an electrically operable control valve 32 and the piston 28 can also be brought to a O-position.

In the arrangement according to FIG. 1 the magnet coil of the valve 23 is fed with current and is therefore closed, the higher pressure $p_2$ being present in the conduit 20. The control valve 32, which has two magnet coils 35 and 36 for its operation, has in FIG. 1 its right coil 35 fed with current, and therefore a slide 30 with two pistons arranged in the valve is brought to the left. In this way the conduit 37 will communicate with the conduit 20 and the conduit 38 will be in connection with a return mixer 19 for pressure medium via a return conduit 63, in which there is atmospheric pressure $p_0$. The piston 28 does not reach its different positions momentarily but adjusts itself with a certain delay through constrictions 61, 62 in a throttle — return valve means 34 and 33 respectively in each of the conduits 37 and 38. The pump 4, the motor 7 and consequently also the cable drum 13 respond momentarily to a change of the position of the control shaft 25. Therefore the desired time for acceleration and retardation of the cable drum 13 and consequently the hoist cable is obtained by a corresponding slow adjusting motion of the control piston 28, which adjusting motion in its turn is dependent on the constrictions 61 and 62.

Figure 2:
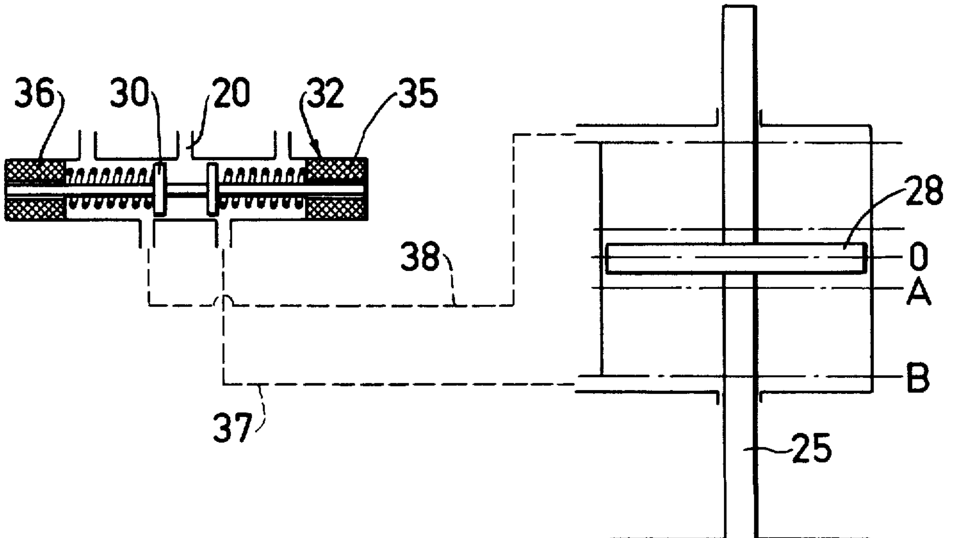
FIG. 2 shows in detail a control means for control of the pump, which means is actuated by a pressure fluid.

The control means 29 is shown more in detail in FIG. 2. The control shaft 25 goes through the spring means 27, which comprises a housing 41, in which a compression spring $S_2$ is clamped between two loose rings 42 and 43, and between two additional rings 44 and 45 there is another compression spring $s_1$. Moreover, the friction means 31 acts on the control shaft 25 with a certain force and creates a frictional force, which tends to prevent motion of the shaft 25. In FIG. 2 the shaft 25 is in its O-position, i.e. position, where the pump 4 with a variable displacement does not give off any pressure medium at all and the cable drum has stopped. Both magnet coils 35, 36 of the control valve 32 are without current, the conduits 37 and 38 and consequently the cylinder regions on both sides of the piston 28 communicating with the return conduit 63. When the slide 30 in the control valve 32 is e.g. moved to the left the conduit 38 will be exposed to the pressure in the conduit 20. Moreover, if it is assumed that the valve 23 shown in FIG. 1 is open and thus the lower pressure $p_1$, the correspondence of which is a force $F_{p1}$ on the piston 28, acts on the piston 28, this will be pressed downwards against the action of a force $F_{S1}$ from the spring S1 and a frictional force $F_f$ from the friction means 31. When the ring 44 approaches the ring 42 corresponding to position A of the piston 28, the control shaft 25 will stop. In order that said motion of the shaft 25 should take place and then be stopped in position A it is required that $$F_{S1} + |F_f| + F_{S2} > |F_{p1}| > F_{S1} + |F_f| \quad (1)$$

Figure 8:
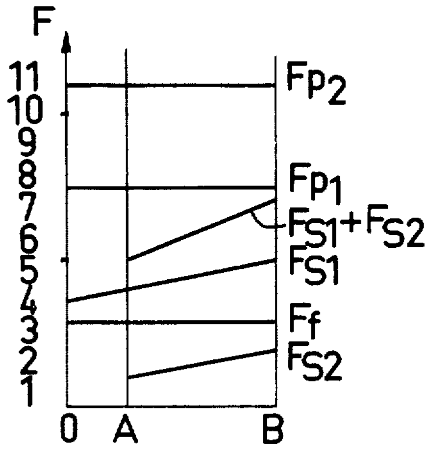
FIG. 8 shows a diagram of the forces acting on a primary shaft in the control means.

A diagram of forces satisfying these conditions is shown in FIG. 8.

When the piston is to be moved further from the position A to a position B, corresponding to a maximum speed of the cable drum 13, the higher pressure $p_2$ is connected in the conduit 20 by the valve 23 in FIG. 1 being closed. Then the piston 28 will be actuated by a force $F_{p2}$ corresponding to $p_2$. The condition for the piston 28 to be moved further to the position B is that $$|F_{p2}| > F_{s1} + |F_f| + F_{s2}. \quad (2)$$

According to the invention it should be possible to stop the piston 28 in every position between A and B. Suppose that the piston is on its way from A to B and that the pressure on the upper side of the piston is $p_2$. Then it will be sufficient to reduce $p_2$ to $p_1$. The spring forces $F_{S1}$ and $F_{S2}$ will try to return the piston to position A. The piston force $F_{p1}$ will act against $F_{S1}$ and $F_{S2}$. The frictional force $F_f$ will act against the direction to which the control shaft 25 will move. Then the condition for the piston 28 to stop between A and B is that $$|F_f| > \left| |F_{p1}| - (F_{S1} + F_{S2}) \right| \quad (3)$$

which is also satisfied by the forces in the diagram according to FIG. 8.

The piston 28 is now assumed to be in position B and is to be returned to position A. Thus the pressure on the piston is $p_2$ from the beginning. If the pressure is lowered to $p_1$ by opening the valve 23 in FIG. 1 nothing will happen, for the condition (3) for a stop is then satisfied. In order that the piston 28 might return the control valve 32 must be reset to the position shown in FIG. 2. The condition for the piston to move towards the A-position is then that $$F_{S1} + F_{S2} > |F_f| \quad (4)$$

In order that the piston 28 might now get into position A it is most practical to let it go or come close to the O-position, after which the pressure $p_1$ is brought to one side of the piston and returns the latter to position A according to the condition (1).

In order to stop the motion of the piston 28, when it is between B and A during its relative slow motion, one need only supply the lower pressure $p_1$ so that the condition (3) is satisfied.

When the cable drum 13 is to be moved in the opposite direction the slide 30 in the control valve 32 is instead moved to the right and the adjustment of the piston 28 takes place in a corresponding way above the O-position shown in FIG. 2.

Figure 3:
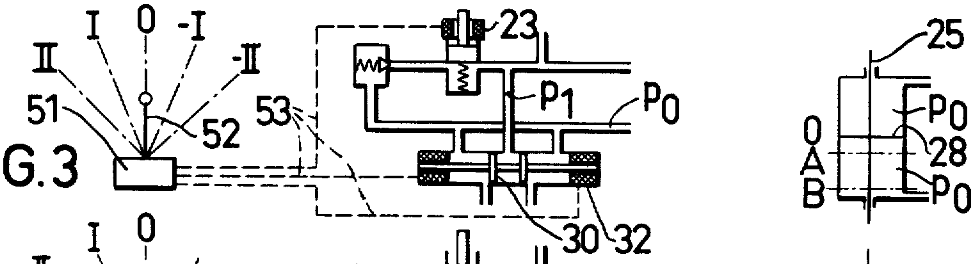
FIGS. 3 – 7 show the deflection of the control means for different positions of a lever governing the control means.

It is intended to control the arrangement of the invention from a control box 51, see FIG. 3, by means of a lever 52, showing five operative positions, i.e. II, I, O, −I and −II, where II corresponds to full speed in one direction of the cable drum 13, I to creep speed in the same direction, O to stationary cable drum, −I to creep speed of the cable drum in the other direction and −II to full speed in the latter direction. The control box 51 is connected to the valve 23 and the control valve 32 via electric lines 53 in order to control the control piston 28 via these. Definite settings of the relative valves 23 and 32 correspond to each position of the lever 52. When the lever 52 is in position O the valve 23 is open and the slide 30 in neutral position. When the lever 52 is in position I (FIG. 4) the valve 23 is open and the slide 30 moved to the left. When the lever is in position II (FIG. 5) the valve 23 is closed and the slide 30 is still moved to the left. When the lever 52 is in position −I the valve 23 is open and the slide 30 moved to the right. Finally, when the lever is in position −II, the valve 23 is closed and the slide 30 is still moved to the right.

Figure 4:
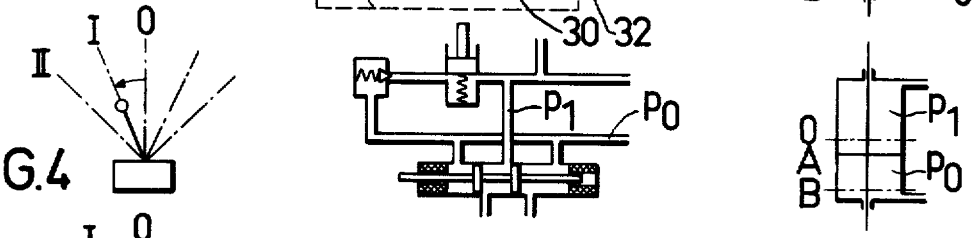
Figure 5:
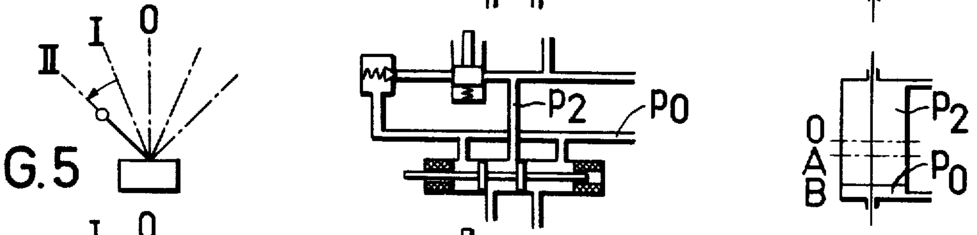
Figure 6:
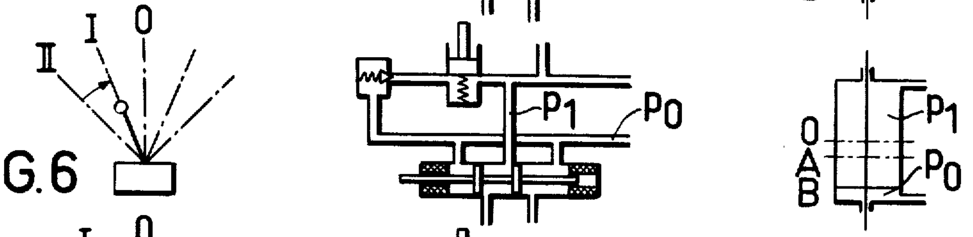
Figure 7:
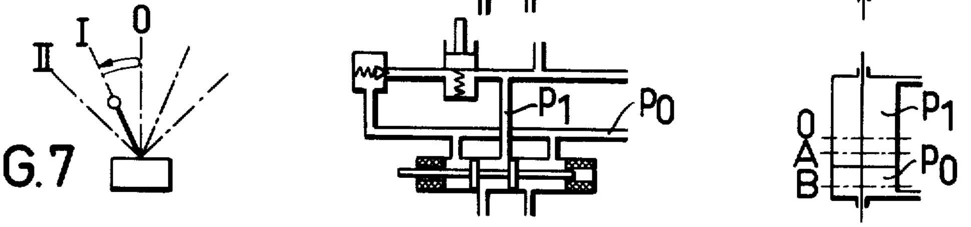

In order to explain the invention additionally FIGS. 3–7 show together with FIGS. 9–13 how the control piston 28 is moved as well as the forces, acting on the control shaft 25 at certain operative consecutive movements of the lever 52 selected as examples. In FIG. 3 the lever 52 is in position O as well as the piston 28 because an equal pressure (the atmospheric pressure $p_O$), see FIG. 9, acts on both sides of the piston and the spring forces $F_{S1}$ have turned the piston to O-position. In FIG. 4 the lever is moved to the definite position I, and then the piston 28 will move towards the position A. The force $F_{p1}$ acts on the piston during this motion from O to A, which force, see FIG. 10, overcomes the spring force $F_{S1}$, and the frictional force $F_f$ from the friction means 31 shown in FIG. 2. The lever is moved further to position II in FIG. 5. The force on the piston will then be $F_{p2}$ (FIG. 11), overcoming the forces $F_{S1}$, $F_{S2}$ and $F_f$. Then the lever is brought back to position I in FIG. 6. The piston 28 will remain in position B. If the force $F_{p1}$, see FIG. 12, should be less than $F_{S1} + F_{S2}$ the force $F_f$ will change direction and aid $F_{p1}$ in maintaining the piston 28 in position B. Then the lever is moved to position O, see FIG. 7, and then back to position I before the piston 25 has got back to position A (the motion of the piston 25 is braked intentionally by means of the constrictions 61 and 62 shown in FIG. 1). Then the piston will stop between position A and B. If $F_{p1}$ is bigger than $F_{S1} + F_{S2}$, see FIG. 13, $F_f$ will aid $F_{S1} + F_{S2}$ in maintaining $F_{p1}$ in balance and if $F_{S1} + F_{S2}$ is bigger than $F_{p1}$, $F_f$ will instead aid F

.

As the time (about 2.5 seconds) for acceleration or retardation of the speed of the cable drum 13 is always considerably longer than the time required for lever operations it is thus possible according to the invention to adjust from a conventional portable control box connected by cable each lifting rate between the higher speed and the lower speed.

The invention is not restricted to the arrangement described above but can be used under several varying conditions. The cable drum 13 can e.g. be directly connected to a slow hydraulic motor, the gear box 11 being superfluous. Moreover the brake 14 can be hydraulically or e.g. pneumatically operated.

If it is desired to have the lower fixed speed corresponding to position A equal to nil the arrangement of the invention is preferably modified by replacing the springs $S_1$ and $S_2$ acting in two steps by a suitable spring constant having a spring acting in one step.

What is claimed is:

1. A hydraulic hoisting system comprising a cable drum, a hydraulic motor coupled to said drum for driving said drum, a variable displacement hydraulic pump coupled to said motor for driving said motor, and a fluid actuated control system for varying the displacement of said pump, said control system comprising a rod mounted for translational movement toward and away from a predetermined neutral position, means connecting said rod to said pump for controlling the displacement of said pump in dependence upon the position of said rod relative to said neutral position thereby to control the rotational speed of said hydraulic motor and of said cable drum coupled thereto, means for selectively moving said rod comprising a hydraulic cylinder having a piston therein connected to said rod, spring means connected to said rod for resiliently resisting movement of said rod, friction means coupled to said rod for frictionally resisting movement of said rod, and a controllable fluid pressure source connected to said cylinder, said pressure source including means operable to selectively supply substantially zero fluid pressure or a first fluid pressure in excess of said zero pressure or a second fluid pressure in excess of said first fluid pressure from said source to said cylinder, said cylinder being responsive to the continued application of said first fluid pressure to said piston to move said rod from said neutral position to an intermediate position located between said neutral position and a predetermined limit position, and said cylinder being responsive to the continued application of said second fluid pressure to said piston to move said rod from said intermediate position to said limit position, the forces imposed on said rod by said spring means and by said friction means being so related to one another and to the magnitude of said first fluid pressure that, when said rod is moving from said intermediate position toward said limit position in response to the application of said second fluid pressure to said piston, a change in fluid pressure at said piston from said second fluid pressure to said first fluid pressure when said rod is at any selected position between said intermediate and limit positions is operative to halt further movement of said piston and the rod connected thereto and to maintain said rod and piston at said selected position between said intermediate and limit positions.

2. The system of claim 1 wherein said controllable fluid pressure source comprises a further hydraulic pump having a pair of pressure relief valves connected to its output, one of said valves being operable to produce said first fluid pressure at said output and the other of said valves being operable to produce said second fluid pressure at said output, and control means for rendering a selected one of said relief valves operative thereby to vary the pressure which is supplied from said source to said cylinder.

3. The system of claim 2 including fluid flow lines connecting said further hydraulic pump to said pair of pressure relief valves, said control means including electrically operable valve means in said lines for controlling the flow of fluid from said further pump to said relief valves, and means for supplying electrical control signals to said valve means thereby to vary the fluid pressure which is applied to said piston.

4. The system of claim 2 wherein said cylinder comprises a double acting cylinder, said control means including further controllable valve means for connecting the output of said further hydraulic pump to one side or the other of said piston thereby to vary the direction of rotation of said hydraulic motor and of the cable drum coupled thereto.

5. The system of claim 4 wherein said further controllable valve means comprises an electrically operable valve, and means for supplying electrical signals to said further valve to control the direction of rotation of said hydraulic motor.

* * * * *